No. 869,187. PATENTED OCT. 22, 1907.
M. C. A. LATOUR.
COMPOUNDED SELF EXCITED ALTERNATOR.
APPLICATION FILED AUG. 8, 1903. RENEWED FEB. 27, 1907.

2 SHEETS—SHEET 1.

Witnesses:
George H. Tilden
Helen Oxford

Inventor:
Marius Charles Arthur Latour
by Albert H. Davis
Att'y

No. 869,187. PATENTED OCT. 22, 1907.
M. C. A. LATOUR.
COMPOUNDED SELF EXCITED ALTERNATOR.
APPLICATION FILED AUG. 8, 1903. RENEWED FEB. 27, 1907.

2 SHEETS—SHEET 2.

Witnesses:

Inventor:
Marius Charles Arthur Latour,
by
Att'y.

UNITED STATES PATENT OFFICE.

MARIUS CHARLES ARTHUR LATOUR, OF SÈVRES, FRANCE, ASSIGNOR TO GENERAL ELECTRIC COMPANY, A CORPORATION OF NEW YORK.

COMPOUNDED SELF-EXCITED ALTERNATOR.

No. 869,187.     Specification of Letters Patent.     Patented Oct. 22, 1907.

Original application filed July 9, 1901, Serial No. 67,668. Divided and this application filed August 8, 1903, Serial No. 168,760. Renewed February 27, 1907. Serial No. 359,611.

*To all whom it may concern:*

Be it known that I, MARIUS CHARLES ARTHUR LA-TOUR, a citizen of France, residing at Sèvres, Department of Seine-et-Oise, have invented certain new and useful Improvements in Compounded Self-Excited Alternators, of which the following is a specification.

This case is a division of my application, Serial No. 67,668, filed July 9, 1901.

This invention has for its object certain improvements in compounded self-excited alternating current machines comprising an induced member which we will hereinafter and for convenience, term the stator and an inducing member or rotor, which latter is composed of a direct current armature and commutator. The shunt excitation currents are taken from the stator terminals or from a portion of the stator winding and the currents for the series winding are the main currents induced in the stator and conducted through the rotor before passing to the transmission or feeder circuits. This shunt and series excitation is used for the purpose of obtaining an alternating current generator whose voltage at terminals will not vary with variations in the non-inductive and inductive loads on the machine.

Figure 1:
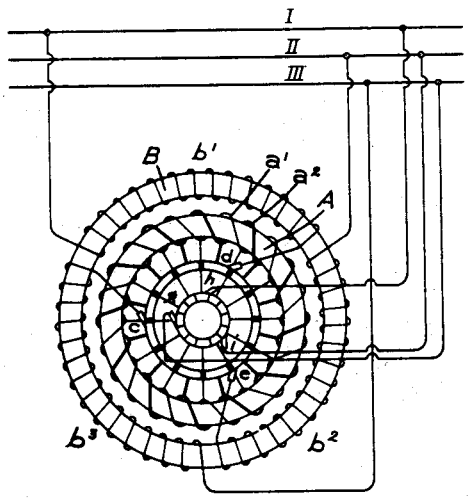
Figure 2:
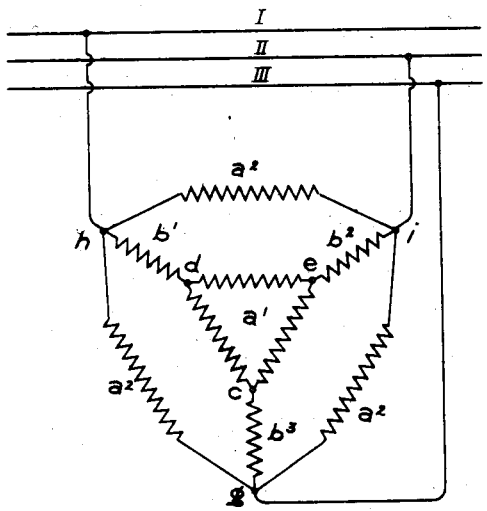
Figure 3:
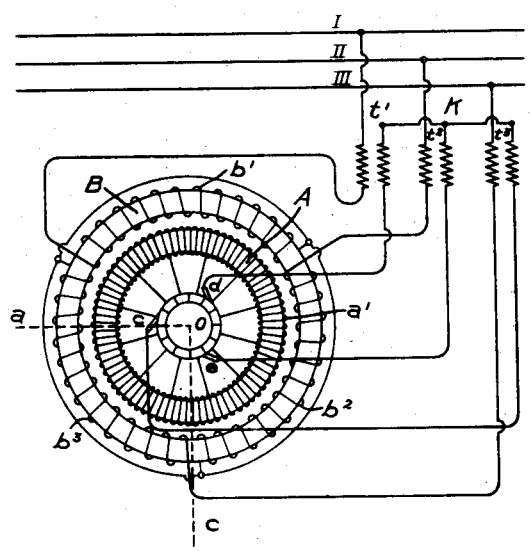
Figure 4:
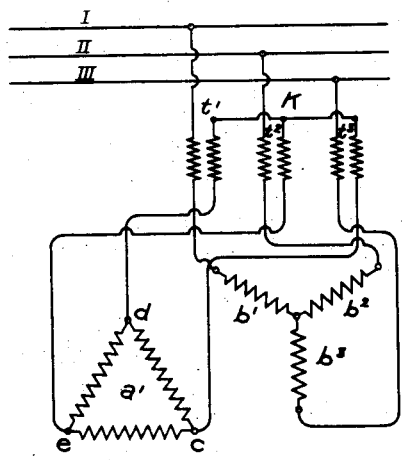
Figure 5:
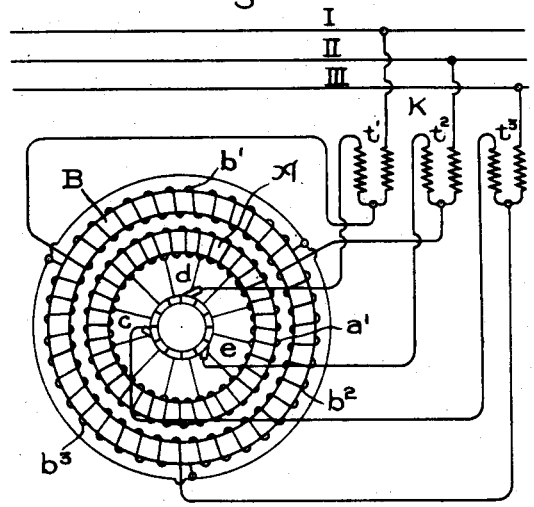
Figure 6:
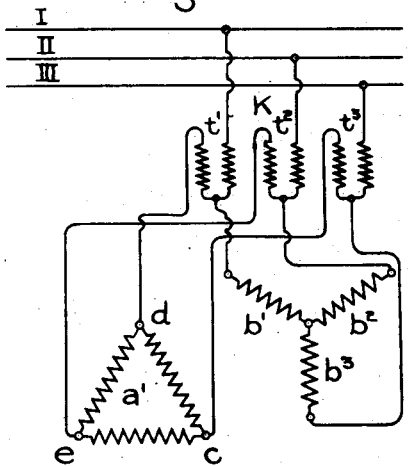
Figure 7:
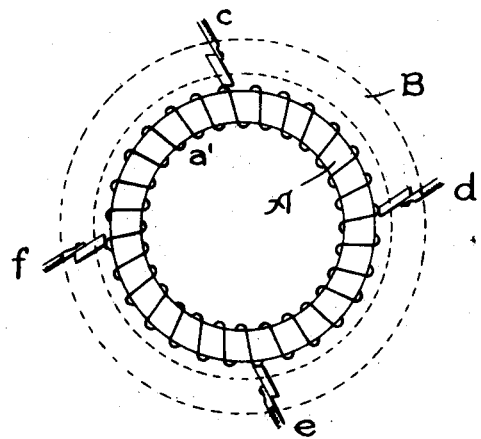

Figure 1 shows diagrammatically a three-phase compounded alternating current generator with double winding and two commutators, and Fig. 2 is a diagram of connections of the machine shown in Fig. 1. Fig. 3 represents a machine with series excitation by means of special transformer, and Fig. 4 is a diagram of connections of this machine. Fig. 5 represent the simplest form of my compounded alternating current generator the electric connections of which are shown in Fig. 6. Fig. 7 is a diagram illustrating the general principle on which the construction of my improved alternator is based assuming that two-phase currents and a bi-polar machine are being dealt with.

Referring now to Figs. 1 and 2, I have shown this machine and its connections to illustrate the most evident manner of compounding an alternating current generator by the use of a double rotor winding and two separate commutators. It is only necessary to arrange matters in such a way that the ampere-turns of the series excitation circuit of the rotor shall be equal to those of the stator in order to nullify the so-called armature reaction of the induced member or stator, in magnitude, form and direction. The series excitation flux must evidently be opposite in direction to that created by the stator turns and this can be arranged by suitably placing the brushes on the commutator as is done in direct current machinery, for example, as proposed in the compensated direct current dynamos of H. J. Ryan.

The shunt winding of the rotor is connected to the stator terminals and supplies a constant excitation practically independent of variations in load. It is evident that a machine arranged as above described will automatically compound for variations in the non-inductive and inductive loads in the several phases separately.

The fundamental principle of the excitation of my alternator may be explained as follows: Referring to Fig. 7, assume a stationary ring A with closed circuit winding the conductors of which are laid bare on the periphery so as to form a commutator to be placed within a homogeneous magnetic medium such as a ring B of soft iron, from which it is separated only by a small air gap. To four brushes $c\ d\ e\ f$ set 90° apart from each other, let two-phase currents of frequency $w$ be supplied; the brushes $c\ e$, for instance, serving for the passage of the current $I \sin 2\pi w\ t$, and the brushes $d\ f$ for the passage of the current $I \cos 2\pi w\ t$. A magnetic flux is thus obtained in the ring A and rotating therein with an angular velocity equal to $w$. The rotation of this flux involves losses in the iron ring due to hysteresis and Foucault currents and this rotation is further rendered evident by the creation of a reactive E. M. F. at the brush terminals $c\ d\ e\ f$.

With the ring A stationary and neglecting, for the present the possible sparking at brushes $c\ d\ e\ f$ assume these four brushes to be rotated in a direction opposite to that of the rotating flux and at an angular velocity equal to $w$; we shall, by this means immediately insure the fixation of the magnetic flux with respect to the ring A. In this case there will be no losses caused by hysteresis or Foucault currents and the ring may then be either solid or laminated.

It is still more remarkable that the system shown in Fig. 1 is devoid of self-induction when excited by polyphase currents, owing to the fact that the brushes are rotated. As a matter of fact the resulting magnetic flux becoming stationary relatively to the conductors of the ring A it cannot therefore induce any E. M. F. whatsoever in these conductors. All induction phenomena therefore disappear and the voltage between the brushes becomes equal to the ohmic drop in the winding of the ring. In other words, the system, although it enables an inducing flux to be obtained does not take wattless currents from the source of three-phase currents and, in the system under consideration, the bi-polar inductor is excited by alternating currents at unity power factor. If instead of rotating the brushes, we leave them stationary, and cause the ring A and its winding to rotate with the speed of synchronism, we have an inducing system revolving in space after the fashion of the inducing field of an alternator with fixed armature.

I have, in the foregoing description, reserved the question of sparking at the brushes c d e f for latter consideration. It is now easy to see that there cannot be any sparking and a simple way of accounting for this is, that as each section of the ring winding is always traversed by the same magnetic flux, there cannot be any e. m. f. induced therein while it is short-circuited under the brushes.

In discussing the question of commutation it is not necessary to introduce therein the notion of the self-induction of the sections of the winding short-circuited under the brushes, whenever the resulting magnetic flux is fixed in position, magnitude and form relatively to the rotor, that is to say, whenever the fundamental flux is not complicated by harmonic variations thereof. Sparkless commutation may be explained either by reference to the phenomena of self-induction in the section short-circuited under the brushes or by the aid of the assumption of fixity of magnetic flux in the commutated rotor winding. It is evident that either one of these two hypotheses may be used independently of the other and furthermore that it is unnecessary to make use of both. I prefer to explain the sparkless commutation of the rotor of my improved alternator by means of the latter assumption, that is, fixity of magnetic flux.

Let us now place the bipolar field magnet of Fig. 1 (which we shall refer to as the "rotor") in the "stator" of a bipolar —p— phase alternating current machine and let us suppose that the excitation is produced with —p— phase currents. The rotor, turning with an angular speed equal to $w$ and being separately excited from any convenient source, will induce necessarily a certain potential difference between the terminals of the stator. These potential differences will have a frequency equal to $w$; and they could therefore be used, if we choose, for the excitation of the rotor itself, in other words, we could obtain, in this manner, self-excitation. For this purpose it is necessary at first that, as in a continuous current dynamo, the induced voltage be just equal to that selected for the excitation, and it is further required that the induced E. M. F. be in phase with the E. M. F. maintained between the brushes by the source of separate excitation.

We will now explain in what manner the concordance of the phases can be insured by a suitable angular position of the brushes. By giving the brushes an angular advance in the direction of rotation of the rotor, the inducing field in the rotor will advance on itself in space and the induced E. M. F. will advance correspondingly in time. The converse phenomena will occur if the brushes are displaced backwards, that is to say, in the direction opposite to the movement of the rotor. There is therefore a position of the brushes in which the concordance of the phases between the E. M. F. of the stator and the E. M. F. between the brushes of the rotor is insured. This concordance being possible, a self excited alternator may be obtained by the suppression of the separate source of excitation, the brushes being of course then connected to the terminals of the stator.

If the excitation is taken directly at the terminals of the stator, even for the low voltage of 110 or 220 volts, a winding of fine wire and of a great number of turns per commutator segment is required. The influence of the harmonic magnetic fluxes on the commutation would then become very important and furthermore the winding would be impracticable.

Residual magnetism generally suffices for starting the machines of Figs. 1, 3 and 5 and they then operate as three-phase automatic compounded alternators with their rotors excited by alternating currents.

When the stator gives out current, the phases of the e. m. fs. at the terminals of the stator are modified in time and for the purpose of maintaining the rotation of the magnetic field flux synchronous with respect to the rotor, it is necessary to displace the brushes in the direction of the movement of the rotor.

When the brushes are not sufficiently displaced to obtain synchronous rotation of the magnetic flux relatively to the rotor the frequency of the stator currents decrease in a definite manner and the magnetic flux rotates less rapidly than the rotor. If, on the contrary, the brushes are displaced too far, the flux rotates more rapidly than the rotor. In any case the angular position of the brushes which insures the absolute fixity of magnetic flux relatively to the rotor, may be compared to the position of the brushes in a shunt wound direct current dynamo whenever the brushes are fixed at right angles to the resultant magnetic flux of the armature and of the fields, because both these angular displacements correspond to zero flux variations in the sections of the rotor winding short-circuited by the brushes and consequently to sparkless commutation.

It is advantageous to operate my improved alternators with the magnetic flux and the rotor in absolute synchronism when the machine is carrying full load, but I wish to claim, not only those machines which run at absolutely synchronous speed, as above defined, but also those machines which run at nearly synchronous speeds, the degree of departure from synchronous speed being of the order of the slip in well designed induction machines. It is, of course, to be understood, that the slip may be positive or negative. Furthermore, a machine built in conformity with the present description cannot run at any and all speeds but must operate at or very near the synchronous speed as above defined.

It is evident that it will not be very practical, except in low voltage machines of small current output, to introduce the induced stator currents directly into the rotor. I therefore propose to make use of series current transformers K connected, as shown in Fig. 4, in the stator circuit of the series wound machine of Fig. 3. By this means I can avoid the difficulties consequent upon the introduction of high voltage or large ampere currents into the rotor windings through the brushes and commutator thereof.

If, in a shunt machine, the brushes are properly set to produce a synchronous rotation of the rotor flux and the rotor body, and if means are provided for neutralizing the armature reaction, so as to prevent a shifting of the phase of the flux as the load varies, it is evident that the flux will rotate synchronously with the rotor body for all loads, and the rotor circuit will be at all times non-inductive. That is, to obtain synchronous operation in a compound machine at all loads, the brushes delivering the shunt excitation to the rotor winding must be properly placed to give synchronous operation at no load, and the brushes delivering the series excitation must be properly placed to neutralize completely the armature reaction. Evidently, if the proper positions for both shunt and series brushes were the same, a single set of brushes could be used for both excitations. By placing inductances in circuit with the shunt excitation, the proper position of the shunt brushes could be shifted to make it the same as the proper position of the series brushes. This is exactly the effect obtained in the arrangement of Fig. 5, since the secondaries of the series transformers act as inductances in circuit with the shunt excitation. Consequently, a single set of brushes and a single rotor winding suffice for obtaining synchronous operation with the arrangement of compounding or compensating transformers shown in Fig. 5. The magnetic flux of the rotor will now rotate synchronously with the iron of the rotor at all loads in view of the automatic compounding of the series excitation whereby the armature reaction of the stator is compensated for in magnitude, direction and form by the series ampere-turns flux of the rotor.

What I claim as new and desire to secure by Letters Patent of the United States is:

1. A self-excited compounded alternator comprising an induced member and an inducing member, the latter consisting of a direct current armature wound with several separate circuits connected to their respective commutators, the magnetic flux of the inducing member being obtained by means of currents derived from the stator or induced member terminals and constituting the shunt excitation and by means of the main currents of the stator or induced member, said currents passing directly through the rotor or inducing member windings or indirectly by the interposition of series current transformers.

2. A self-excited compounded alternator comprising an inducing and an induced member, the first consisting of a direct current armature wound with a single winding connected to a commutator through which are caused to pass the shunt excitation current derived from the stator or induced member terminals and the series excitation currents derived from the main currents of the induced member by the interposition of special series current transformers substantially as hereinbefore described.

3. In an alternating current generator, a field having a distributed winding connected to a many-part commutator, and means for supplying the said winding polyphase currents taken part in derivation from the armature, and part in series with the line.

4. In an alternating current generator, a field having a distributed winding connected to a many-part commutator, brushes bearing on said commutator, and compensating transformers connected and arranged to supply to said brushes polyphase currents varying with both the armature voltage and the armature current.

5. In an alternating current generator, a field having a distributed winding connected to a many-part commutator, brushes bearing on said commutator, and compensating transformers connected and arranged to impress on said brushes superimposed voltages corresponding in magnitude respectively to the armature voltage and to the armature current.

6. In combination, a self-exciting alternating-current generator having two members, each provided with a distributed winding, one of said members being mechanically driven, polyphase connections between said windings, a load-circuit supplied with current from said generator, and means responsive to variation in load for controlling the excitation of said generator.

7. In combination, an alternating-current generator comprising relatively rotatable members one of which is mechanically driven and each of which is provided with a distributed winding, a commutator for one of said windings, brushes bearing on said commutator, polyphase connections for supplying an exciting current through said brushes to the winding connected to the commutator, a load-circuit supplied with current from said generator, and means for compounding the generator for variation of load.

8. In combination, an alternating-current generator comprising relatively rotatable members one of which is mechanically driven and each of which is provided with a distributed winding, a commutator for one of said windings, brushes bearing on said commutator, polyphase connections for supplying through said brushes to the winding connected to the commutator an exciting current dependent upon the voltage of the generator, a load circuit supplied with current from said generator, and means responsive to variation in load for varying the amount of the exciting current supplied through said brushes.

9. The combination with an alternating-current electric circuit, of an alternating-current dynamo-electric machine comprising two relatively movable windings, the said windings being adapted to have one of said windings, traversed by alternating-current, induced currents in the other of said windings whereby a field will be produced by the latter current which will move asynchronously with relation to the field produced by the first mentioned current, and means for supplying current, proportional to the current in said alternating-current circuit, to said other winding whereby the demagnetizing action of the first mentioned current is opposed, substantially as described.

10. The combination with an alternating-current electric circuit, of an alternating-current dynamo-electric machine comprising two relatively movable windings, the said windings being adapted to have one of said windings, traversed by alternating-current, induce currents in the other of said windings whereby a field will be produced by the latter current which will move asynchronously with relation to the field produced by the first mentioned current, means for exciting said other winding by current at a substantially constant potential, and means for supplying current, proportional to the current in said alternating-current circuit, to said other winding whereby the demagnetizing action of the first mentioned current is opposed, substantially as described.

11. In a single or polyphase alternating-current motor or generator, the combination with brushes, and a commutator, of a main stator winding, a winding connected to said commutator, a circuit connected in series with said stator winding and to said brushes, for the purpose of supplying to the rotor a component increasing or decreasing with the main current to annihilate the armature reaction of the working current, and an auxiliary winding of sensibly constant potential connected to said brushes, substantially as described.

In witness whereof, I have hereunto set my hand this 20th day of July, 1903.

MARIUS CHARLES ARTHUR LATOUR.

Witnesses:
 A. S. GARFIELD,
 AUGUSTUS E. INGRAM.